United States Patent
Machida

(10) Patent No.: US 7,293,459 B2
(45) Date of Patent: Nov. 13, 2007

(54) IMAGE-BASED SENSING OF ACCELERATION

(75) Inventor: Akihiro Machida, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/232,619

(22) Filed: Sep. 22, 2005

(65) Prior Publication Data

US 2007/0062284 A1    Mar. 22, 2007

(51) Int. Cl.
*G01P 15/08* (2006.01)
*G01P 15/13* (2006.01)

(52) U.S. Cl. .................. 73/514.26; 73/491; 73/509; 73/514.19

(58) Field of Classification Search .......... 73/513, 73/491, 499, 504.03, 509, 514.19, 514.26
See application file for complete search history.

(56) References Cited

U.S. PATENT DOCUMENTS

| | | | |
|---|---|---|---|
| 3,537,307 A | 11/1970 | Pliha | |
| 3,651,691 A | 3/1972 | Pliha | |
| 3,835,273 A | 9/1974 | Stolarik | |
| 4,495,814 A | 1/1985 | Steinke | |
| 4,844,602 A | 7/1989 | Kitagishi et al. | |
| 4,970,540 A | 11/1990 | Vasey et al. | |
| 5,155,520 A | 10/1992 | Nagasaki et al. | |
| 5,578,813 A | 11/1996 | Allen et al. | |
| 5,644,139 A * | 7/1997 | Allen et al. | 250/557 |
| 5,794,078 A | 8/1998 | Okazaki | |
| 5,960,376 A | 9/1999 | Yamakado et al. | |
| 5,982,421 A | 11/1999 | Inou et al. | |
| 6,747,690 B2 | 6/2004 | Molgaard | |
| 6,927,758 B1 * | 8/2005 | Piot et al. | 345/166 |
| 2002/0166756 A1 | 11/2002 | Thompson | |
| 2005/0095697 A1 * | 5/2005 | Bachur et al. | 435/287.2 |

FOREIGN PATENT DOCUMENTS

| | | | |
|---|---|---|---|
| EP | 525714 A1 * | 2/1993 | |
| FR | 2707755 A1 * | 1/1995 | |
| JP | 2000097968 A * | 4/2000 | |
| JP | 2004073398 A * | 3/2004 | |
| JP | 2006201621 A * | 8/2006 | |

* cited by examiner

*Primary Examiner*—Hezron Williams
*Assistant Examiner*—Samir M. Shah

(57) ABSTRACT

A system includes a support, a pendular element, an elastic restraint, an image sensor, and a processing system. The elastic restraint couples the pendular element to the support and applies to the pendular element a restraining force that opposes movement of the pendular element in at least a first direction. The image sensor captures images of the pendular element. The processing system determines one or more movement measures describing movement of the support from comparisons of ones of the images captured by the image sensor. In another aspect, a pendular element is elastically coupled to a support. A restraining force that opposes movement of the pendular element in at least a first direction is applied to the pendular element. Images of the pendular element are captured. One or more movement measures describing movement of the support are determined from comparisons of ones of the captured images.

21 Claims, 4 Drawing Sheets

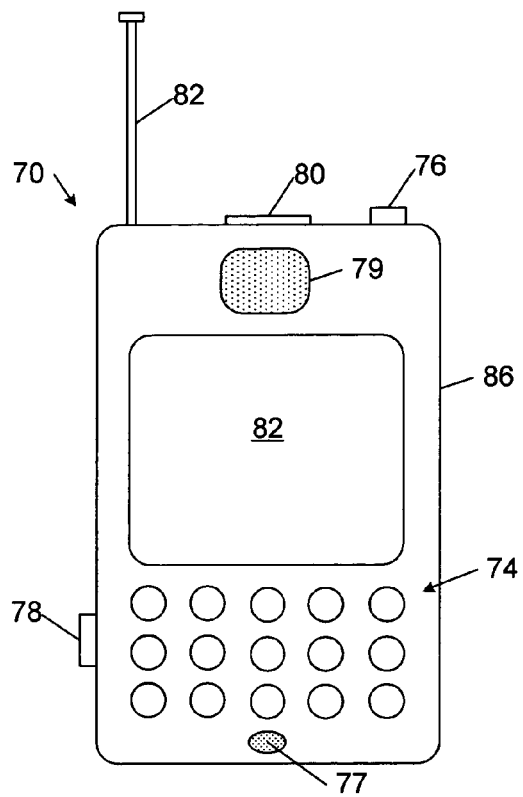
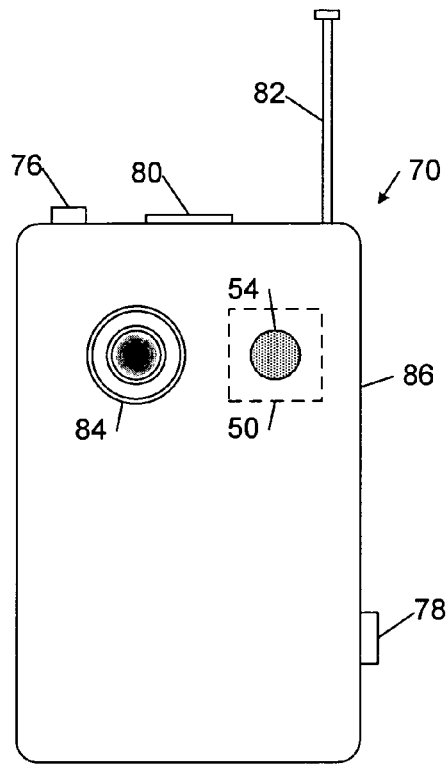
FIG. 5A
FIG. 5B
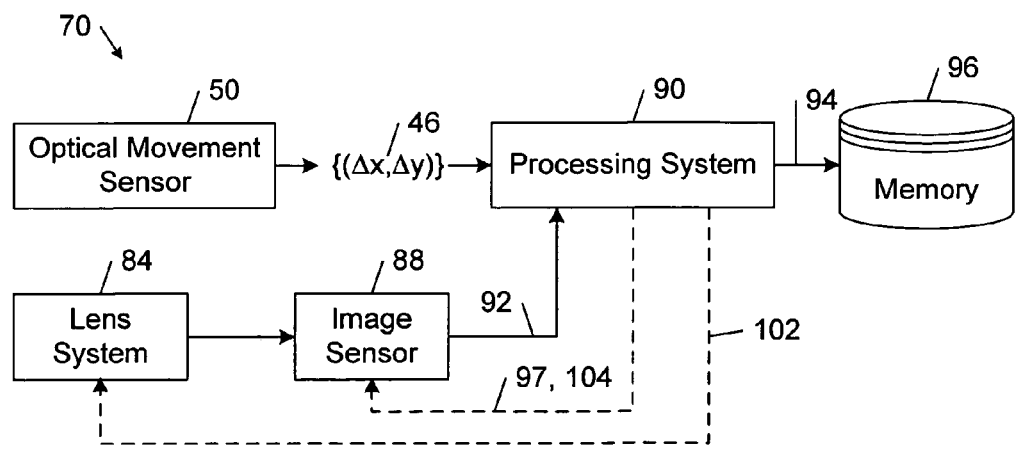
FIG. 6

IMAGE-BASED SENSING OF ACCELERATION

BACKGROUND

A wide variety of different types of devices (commonly referred to as "accelerometers") that are capable of sensing acceleration have been developed. The most common types of accelerometers measure accelerations by sensing changes in one of more of the following physical parameters in response to acceleration: piezoelectric voltage, capacitance, piezoresistance, magnetic inductance, and resonance. Some accelerometers, such as force balance pendulous accelerometers, measure linear acceleration along one, two or three axes. These types of accelerometers typically use a spring mechanism to measure the inertia associated with the acceleration of a test mass. Other accelerometers, such as gyrometers, measure circular or angular acceleration.

Existing accelerometers that are capable of accurately measuring static or low frequency accelerations tend to be expensive or relatively large in size. What is needed is a small and low-cost accelerometer that is capable of measuring static or low frequency accelerations, such as those commonly found in human motion (e.g., due to hand shaking).

SUMMARY

In one aspect, the invention features a system that includes a support, a pendular element, an elastic restraint, an image sensor, and a processing system. The elastic restraint couples the pendular element to the support and applies to the pendular element a restraining force that opposes movement of the pendular element in at least a first direction. The image sensor captures images of the pendular element. The processing system determines one or more movement measures describing movement of the support from comparisons of ones of the images captured by the image sensor.

In another aspect, the invention features a method in which a pendular element is elastically coupled to a support. A restraining force that opposes movement of the pendular element in at least a first direction is applied to the pendular element. Images of the pendular element are captured. One or more movement measures describing movement of the support are determined from comparisons of ones of the captured images.

Other features and advantages of the invention will become apparent from the following description, including the drawings and the claims.

DESCRIPTION OF DRAWINGS

FIGS. 5A and 5B are diagrammatic front and back views of a portable electronic device that incorporates an embodiment of the acceleration sensing system shown in FIG. 4.

FIG. 6 is a block diagram of components of an implementation of the portable electronic device shown in FIGS. 5A and 5B.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
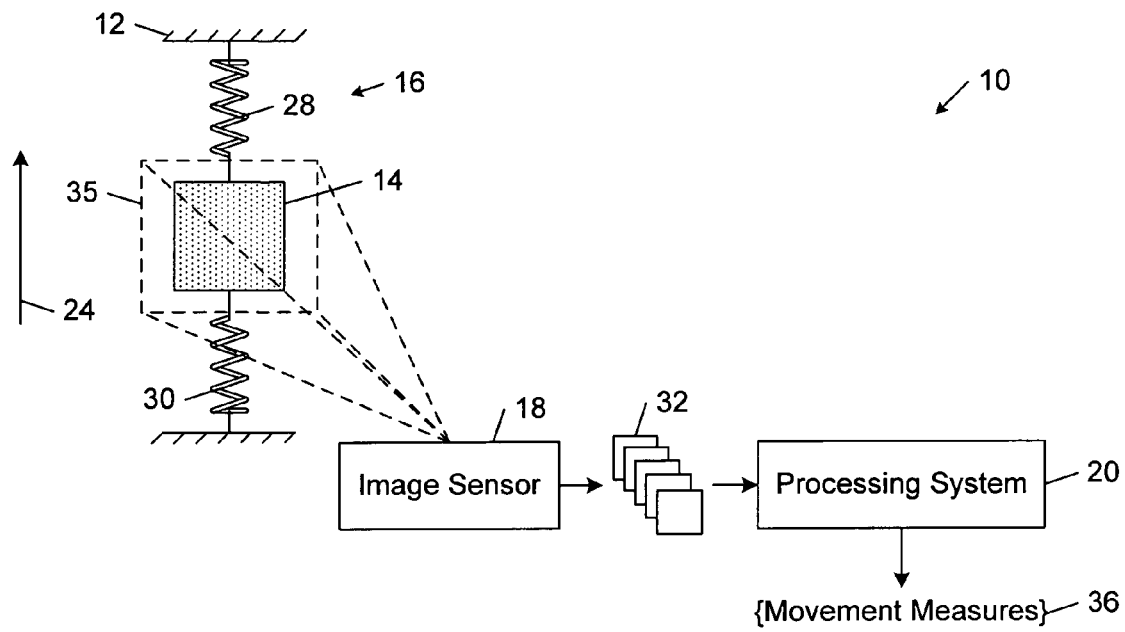
FIG. 1 is a diagrammatic view of an embodiment of an acceleration sensing system.

FIG. 1 shows an embodiment of an acceleration sensing system 10 that includes a support 12, a pendular element 14, an elastic restraint 16, an image sensor 18, and a processing system 20. As explained in detail below, the acceleration sensing system 10 is capable of measuring static or low frequency accelerations, such as those commonly found in human motion (e.g., due to hand shaking). The acceleration sensing system 10 may be implemented with relatively small and inexpensive components, making it highly suitable for incorporation in any type of device in which information about the movement of the device may be used advantageously. In some embodiments, the acceleration sensing device 10 is incorporated in a mobile device, such as a cellular telephone, a cordless telephone, a portable memory device (e.g., a smart card), a personal digital assistant (PDA), a solid state digital audio player, a CD player, an MCD player, a camera, a game controller, a pager, and a laptop computer.

Figure 2:
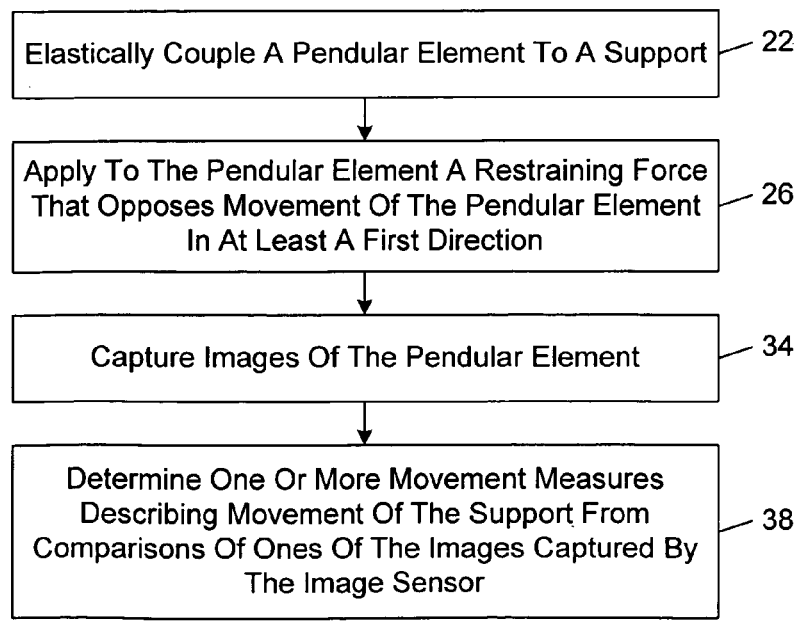
FIG. 2 is a flow diagram of an embodiment of a method of sensing acceleration.

FIG. 2 shows an embodiment of a method by which the acceleration sensing system 10 senses acceleration.

The support 12 may be implemented by any type of structure that defines an inertial reference frame of the acceleration sensing system 10. In some implementations, the support 12 is part of the body or housing of the acceleration sensing system 10 or is a structure that is connected rigidly to the body or housing of the acceleration sensing system 10.

The elastic restraint 16 electrically couples the pendular element 14 to the support 12 (block 22; FIG. 2). The elastic restraint applies to the pendular element a restraining force that opposes movement of the pendular element in at least a first direction 24 (block 26; FIG. 2). In general, the elastic restraint 16 may be implemented by any type of material or structure that is capable of deforming in a way that allows the pendular element 14 to move relative to the support 12 in at least the first direction 24 in response to an inertial force that is produced by acceleration of the acceleration sensing system 10. In the illustrated embodiment, the elastic restraint 16 includes a first elastic element 28 and a second elastic element 30 that couple opposite sides of the pendular element 14 to the support 12 along an axis that is parallel to the first direction 24. The first and second elastic elements 28, 30 may be implemented by an elastic material, such as a base metal, a metal alloy, a plastic material, an elastomer, or a fibrous material that is capable of elastically stretching. In some embodiments, the first and second elastic elements 28, 30 are shaped into any of a wide variety of different spring shapes, including helical, spiral or coil spring shapes, elliptical or half-elliptical leaf spring shapes, flat spring shapes, and volute spring shapes.

The image sensor 18 captures images 32 of the pendular element 14 (block 34; FIG. 2). The image sensor 18 has a field of view 35 that encompasses at least a portion of the pendular element 14 throughout a specified range of motion of the pendular element 14 in the first direction 24. The image sensor 18 may be any type of image sensor, including a charge coupled device (CCD) image sensor or a complementary metal-oxide-semiconductor (CMOS) image sensor. The image sensor 18 may include one or more lenses that focus light that is reflected or transmitted through the pendular element 14 onto the active area of the image sensor 18. The pendular element 14 may be illuminated by ambient light, which may be transmitted through a window of a housing of the acceleration sensing system 10, or by a light source (e.g., a light emitting diode or a laser diode).

The processing system 20 may be implemented by one or more discrete modules that are not limited to any particular hardware or software configuration and may be implemented in any computing or processing environment, including in digital electronic circuitry or in computer hardware, firmware, device driver, or software.

The processing system 20 determines one or more movement measures 36 describing movement of the support frame 12 from comparisons of ones of the images 32 captured by the image sensor 18 (block 38; FIG. 2). In some embodiments, the processing system 20 measures the acceleration of the support 12 (and hence the acceleration sensing system 10) from the movements of the pendular element 14, and then derives measures of the velocity and the displacement of the acceleration sensing system 10 from the determined acceleration measurements. In some embodiments, the processing system 20 determines the tilt orientation of the acceleration sensing system 10 relative to the gravitational force. The movement measures 36 may include one or more of the acceleration measures, the velocity measures, the displacement measures, and the tilt orientation measure.

In some embodiments, the processing system 20 measures movement of the pendular element 14 based on comparisons between ones of the images 32 that are captured by the image sensor 18. In this regard, the processing system 20 identifies structural or other features (e.g., reference markings) in the images 32 and tracks the motion of such features across multiple images. The processing system 20 identifies common features in sequential images and determines the direction and distance by which the identified common features are shifted or displaced.

In some implementations, the processing system 20 correlates the features that are identified in successive ones of the images 32 to compare the positions of the corresponding features in successive images to provide information relating to the position of the pendular element 14 relative to the support 12. In general, any type of correlation method may be used to track the positions of features across successive images 32. In some embodiments, a sum of squared differences lo correlation method is used to find the locations of identical features in successive images 32 in order to determine the displacements of the features across the images 32. In some of these embodiments, the displacements are summed or integrated over a number of images. The resulting integration values may be scaled to compensate for any image scaling by the optics associated with the image sensor 18. Additional details relating to the image processing and correlating methods that are performed by the processing system 20 can be found in U.S. Pat. Nos. 5,578,813, 5,644,139, 5,703,353, 5,729,008, 5,769,384, 5,825,044, 5,900,625, 6,005,681, 6,037,643, 6,049,338, 6,249,360, 6,259,826, 6,233,368, and 6,927,758. In some embodiments, the image sensor 18 and at least a portion of the processing system 20 may be implemented by an optical mouse navigation sensor module (e.g., the ADNS-2051 optical mouse navigation sensor available from Agilent Technologies, Inc. of Palo Alto, Calif., U.S.A.).

In some implementations, the processing system 20 determines the direction and distance by which the pendular element 14 is displaced relative to a reference position on the pendular element 14 when there is essentially no net acceleration in the first direction 24 in a world inertial reference frame defined by world coordinates (e.g., when the first direction 24 is orthogonal to the gravitational force and the acceleration sensing system 10 is not accelerating in the world inertial reference frame). In some of these implementations, the pendular element 14 contains a detectable reference pattern (e.g., one or more reference marks) and the processing system determines the displacement of the pendular element 14 relative to a coordinate system centered with respect to the reference pattern in the inertial reference frame that is defined by the support 12.

The processing system 20 converts the determined displacement values (e.g., $\vec{\Delta x}$) into a measure of the acceleration ($\vec{a}_{EFF}$) of the support 12 (and hence the acceleration sensing system 10) in accordance with equation (1):

$$\vec{a}_{EFF} = \frac{k_{EFF}}{m} \cdot \vec{\Delta x} \quad (1)$$

where $\vec{a}_{EFF}$ is the effective acceleration, $k_{EFF}$ is the effective spring constant of the elastic restraint 16 and m is the mass of the pendular element 14. The effective acceleration $\vec{a}_{EFF}$ corresponds to the net acceleration due to the acceleration ($a_{PENDULAR}$) of the pendular element 14 and the gravitational acceleration ($\vec{g}$). That is:

$$\vec{a}_{EFF} = \vec{a}_{PENDULAR} - \vec{g} \quad (2)$$

The processing system 20 determines the velocity of the acceleration sensing system 10 during a specified period by performing a single time integration (or summing) of the acceleration measures over the specified period. The processing system 20 determines the displacement of the acceleration sensing system 10 during a specified period by performing two time integrations of the acceleration measures over the specified period.

In some embodiments, the processing system 20 determines the tilt orientation of the acceleration sensing system 10 relative to the gravitational field direction based on the absolute position of the pendular element 14 relative to a precalibrated reference position. In some implementations, the precalibrated reference position of the pendular element 14 corresponds to the position of a reference mark (e.g., a central dark dot) when there is essentially no net acceleration in the first direction 24 in a world inertial reference frame defined by world coordinates (e.g., when the first direction 24 is orthogonal to the gravitational force and the acceleration sensing system 10 is not accelerating in the world inertial reference frame). In these implementations, the tilt direction may be determined directly from the value of the acceleration measure. For example, in one implementation, if the acceleration measure is zero, the acceleration sensing system 10 is oriented orthogonally to the gravitational field direction; of the acceleration measure is greater than zero, the acceleration sensing system 10 is tilted in the first direction relative to the gravitational field direction; and if the acceleration measure is less than zero, the acceleration sensing system 10 is tilted in a direction opposite the first direction.

The movement measures 36 that are determined by the processing system 20 may be used in any of a wide variety of different applications, including tilt sensing applications (e.g., inclinometers, anti-theft devices, game pads, joysticks, sports diagnostics, physical therapy applications, PDAs, LCD projectors, and camera stability), position sensing applications (e.g., navigation and map tracking), motion sensing applications (e.g., vehicle braking, pedometers, drop protection, battery power control, robotics, motion control, and virtual reality), vibration sensing applications (e.g., seismic activity detection, smart motor maintenance, hard disk drive vibration correction, acoustics measurement and control), and shock sensing applications (e.g., event data recorders, hard disk drive protection, and shipping and handling monitors). The movement measures 36 that are determined by the acceleration sensing system 10 may be used with the measurements obtained from other motion sensors (e.g., linear accelerometers or angular accelerometers) to determine physical movement parameters, such as orientation, and to cancel the effects of gravity to determine a measure of the absolute acceleration of the acceleration sensor 10.

Figure 3:
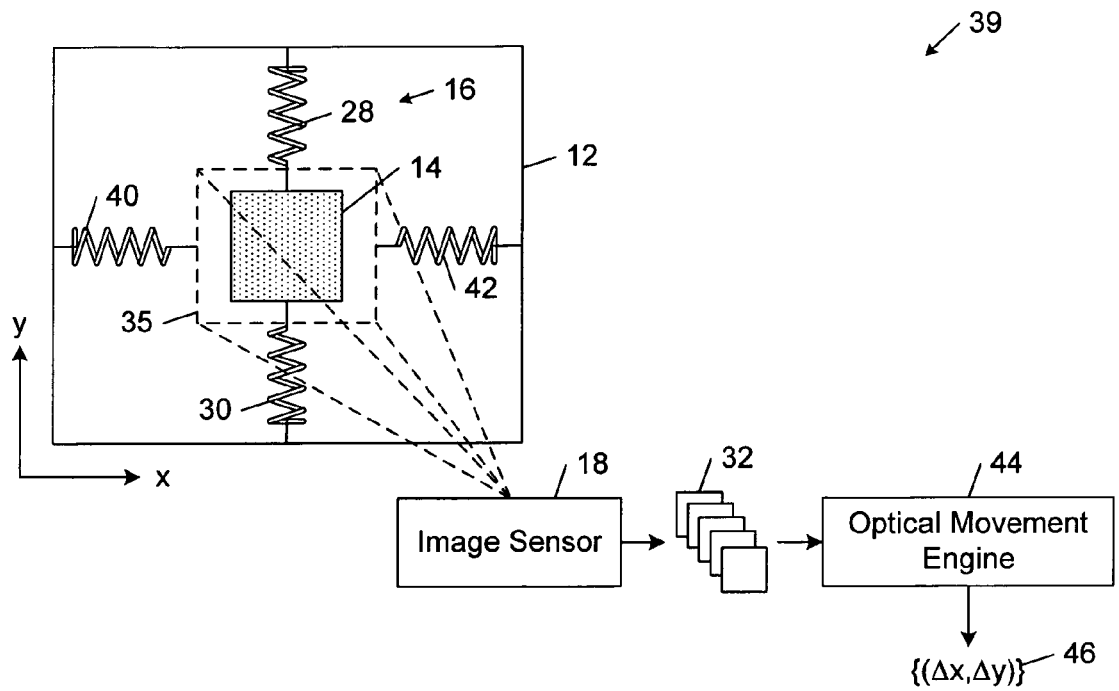
FIG. 3 is a diagrammatic view of an embodiment of an acceleration sensing system.

FIG. 3 shows an embodiment of an acceleration sensing system 39 that corresponds to the acceleration sensing system 10 except that the elastic restraint 16 additionally includes a third elastic element 40 and a fourth elastic element 42, and the processing system 20 consists of an optical movement engine 44. In some implementations, the image sensor 18 and the optical movement engine 44 are implemented by an optical mouse navigation sensor module (e.g., the ADNS-2051 optical mouse navigation sensor available from Agilent Technologies, Inc. of Palo Alto, Calif., U.S.A.).

The third and fourth elastic elements 40, 42 couple opposite sides of the pendular element 14 to the support 12 along an axis that is substantially orthogonal to the axis along which the first and second elastic elements 28, 30 couple the pendular element 14 to the support 12. In the illustrated embodiment, the first and second elastic elements 28, 30 couple the pendular element 14 to the support along an axis that is parallel to the y-direction, and the third and fourth elastic elements 40, 42 couple the pendular element 14 to the support along an axis that is parallel to the x-direction.

The optical movement engine 44 measures movement of the pendular element 14 based on comparisons between ones of the images 32 that are captured by the image sensor 18 in the same way as the processing system 20. That is, the movement engine 44 identifies structural or other features (e.g., reference markings) in the images 32 and tracks the motion of such features across multiple images 32. The movement engine 44 identifies common features in sequential images 32 and determines the direction and distance by which the identified common features are shifted or displaced. The optical movement engine 44 generates an output signal that corresponds to the measurements 46 (e.g., $\{(\Delta x, \Delta y)\}$) of the movement of the pendular element 14.

Figure 4:
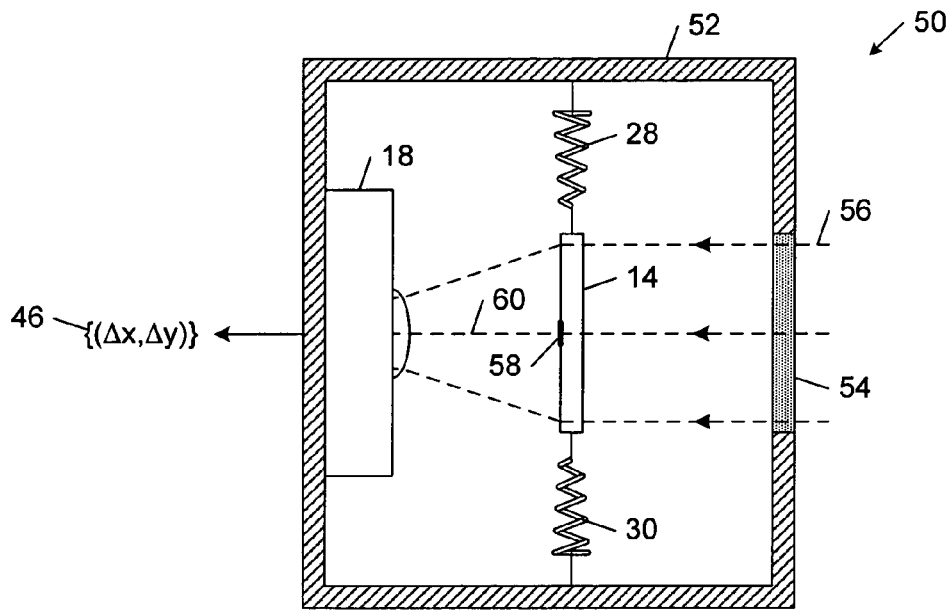
FIG. 4 is a diagrammatic side view of an embodiment of the acceleration sensing system shown in FIG. 3 mounted within a housing.

FIG. 4 shows an embodiment of an acceleration sensing system 50 that includes a housing 52 that contains an implementation of the acceleration sensing system 39. The housing 52 may be formed from a molded plastic material or a metal. The housing 52 includes a window 54 through which external light 56 is transmitted into the housing 52. In the illustrated embodiment, at least a portion of the pendular element 14 includes a material (e.g., glass, quartz or a fibrous material, such as a thin piece of paper) that is transmissive of light within a specified wavelength range (e.g., visible light or infrared light). The degree of light transmissivity need only be sufficient to allow the image sensor 18 to capture structural or other features (e.g., reference markings) on or in the pendular element 14 with sufficient clarity that the optical movement engine 44 can detect and track the movement of these features across ones of the images 32.

In the illustrated embodiment, the pendular element 14 includes a reference pattern that consists of a dark dot 58 that coincides with the optical axis 60 of the image sensor 18 when there is essentially no net acceleration in the x-y plane in a world inertial reference frame defined by world coordinates (e.g., when the x-y plane is orthogonal to the gravitational force and the acceleration sensing system 10 is not accelerating in the world inertial reference frame). In some implementations, the dark dot 58 is formed of an ink that is printed on the pendular element. In some implementations, the dark dot 58 has a size between 50 micrometers and 1 millimeter. The ink may be of a type that absorbs or reflects the light 56 within the specified wavelength range. In this embodiment, the optical movement engine 44 determines the displacement of the pendular element 14 relative to a coordinate system that is centered with respect to the dark dot 58 in the inertial reference frame that is defined by the housing 52.

FIGS. 5A and 5B are diagrammatic front and back views of a portable electronic device 70 that incorporates an implementation of the acceleration sensing system 50. The portable electronic device 70 may be, for example, a cellular telephone, a cordless telephone, a pager, a PDA, or a digital audio player. The portable electronic device 70 includes a screen 72, a keypad 74, an output port 76 for connecting to an input jack of an audio output device (e.g., headphones), and a cable port 78 for connecting to a computer or other hardware system. The portable electronic device 70 also includes a microphone 77 and a speaker 79. The portable electronic device 70 additionally includes a wireless communication port 80, for example, an IrDA (Infrared Data Association) port, through which the portable electronic device 70 may wirelessly communicate with other similarly configured devices. Some embodiments may include an RF antenna 82 instead of, or in addition to, the wireless communication port 80. The screen 72 displays a graphical user interface, which may present one or more user options for controlling the operation of the portable electronic device 70.

As shown in the back view of FIG. 5B, the portable electronic device 70 includes a lens system 84 and the acceleration sensing system 50 shown in FIG. 4. The lens system 84 and the window 54 of the acceleration sensing system 50 are incorporated into the housing 86 of the portable electronic device 70 and permit external light from outside the housing 86 to pass into the housing 84 to respective components of the portable electronic device 70.

FIG. 6 shows a block diagram of some of the components of an implementation of the portable electronic device 70. In this implementation, the lens system 84 focuses external light from a scene onto the capture plane of an image sensor 88, which may be any type of image sensor, including a CCD image sensor or a CMOS image sensor. The optical movement sensor 50 transmits the measurements 46 (e.g., $\{(\Delta x, \Delta y)\}$) of the movement of the pendular element 14 to a processing system 90. In some embodiments, the processing system 90 may be implemented by hardware components or by firmware components or by a combination of hardware and firmware components. The processing system 90 processes the images 92 that are captured by the image sensor 88 in any one of a wide variety of different ways. For example, the processing system 90 may demosaic and color-correct the images 92. The processing system 90 may generate compressed images 94 from the demosaiced and color-corrected images in accordance with an image compression process (e.g., JPEG). The compressed images 94 are stored in a memory 96 in the form of one or more discrete image files. The memory 96 may be implemented by any type of image storage technology, including a compact flash memory card and a digital video tape cassette. The image data that is stored in the memory 96 may be transferred to a storage device (e.g., a hard disk drive, a floppy disk drive, a CD-ROM drive, or a non-volatile data storage device) of an external processing system (e.g., a computer or workstation) via the cable port 78, the wireless communications port 80, or the RF antenna 82.

In some embodiments, the processing system 90 associates the images 92 that are captured by the image sensor 88 with the corresponding ones of the measurements 46 that are made during the exposure periods of the corresponding images 92. The processing system 90 may store the measurements in a header (e.g., an EXIF header) of the image files 94 that are stored in the memory 96 or in a separate data structure that is linked to the corresponding ones of the image files 94. The movement measurements 46 may be used by an image processing application to process the images 94 (e.g., to remove blurring or motion artifacts). In other embodiments, the processing system 90 converts the measurements 46 into the movement measures 36 (e.g., acceleration, velocity, displacement, and tilt), as described above. In these embodiments, the processing system 90 may store the movement measures 36 in a header (e.g., an EXIF header) of the image files 94 that are stored in the memory 96 or in a separate data structure that is linked to the corresponding ones of the image files 94.

In some embodiments, the processing system 90 may use the tilt measures to control how an image 94 is displayed on the screen 72 (e.g., in a portrait orientation or a landscape orientation).

In some embodiments, the processing system 90 generates control signals 97 that cause the image sensor 88 to dynamically displace the pixel information (accumulated photogenerated charges) in directions and amounts that correspond to the movement measures 36 that are determined by the processing system 90. In particular, the control signals 97 may direct the image sensor 88 to displace the individual pixel information in the capture plane of the image sensor 88 in a way that actively compensates for any movements of the image that is focused by the lens system 84 onto the capture plane of the image sensor 88. In this way, blurring and other motion-related artifacts that might otherwise be caused by vibrations (e.g., hand shaking) may be reduced.

Figure 7:
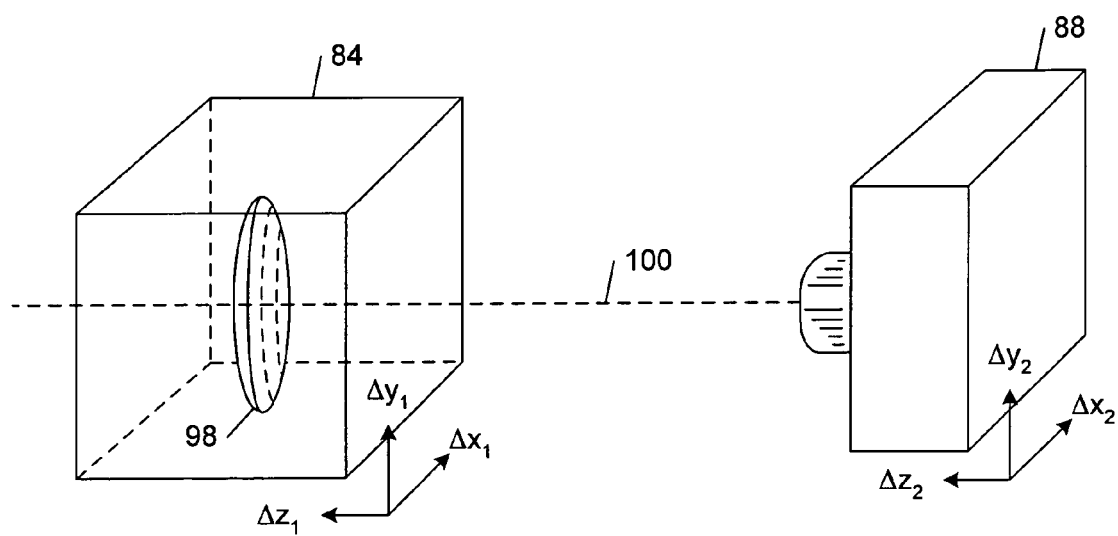
FIG. 7 is a diagrammatic view of embodiment of a lens system and an embodiment of an image sensor in an implementation of the portable electronic device shown in FIGS. 5A, 5B, and 6.

FIG. 7 shows a portion of an embodiment of the portable electronic device 70 in which the lens system 84 includes one or more compensation optical components 98 that may be moved relative to the optical axis 100 by an amount ($\Delta x_1$, $\Delta y_1$, $\Delta z_1$) that adjusts the position of the image that is focused onto the capture plane of the image sensor 88 to compensate for any movement of the portable electronic device 70. In these embodiments, the processing system 90 generates control signals 102 that adjust the position of the compensation optical components 98 based on the movement measures 36 that are determined by the processing system 90. In this way, blurring and other motion-related artifacts that might otherwise be caused by vibrations (e.g., hand shaking) may be reduced. The compensation optical components 98 may be moved using any type of precision-movement controllers (e.g., piezoelectric actuators).

In some implementations, the position of the image sensor 88 may be moved relative to the optical axis 100 by an amount ($\Delta x_2$, $\Delta y_2$, $\Delta z_2$) that adjusts the position of the image that is focused onto the capture plane of the image sensor 88 to compensate for any movement of the portable electronic device 70. In these embodiments, the processing system 90 generates control signals 104 that adjust the position of the image sensor 88 based on the movement measures 36 that are determined by the processing system 90.

Other embodiments are within the scope of the claims.

What is claimed is:

1. A system, comprising:
    a support;
    a pendular element;
    an elastic restraint coupling the pendular element to the support and operable to apply to the pendular element a restraining force that opposes movement of the pendular element in at least a first direction;
    an image sensor operable to capture images of the pendular element; and
    a processing system operable to determine one or more movement measures describing movement of the support from comparisons of ones of the images captured by the image sensor.

2. The system of claim 1, wherein the pendular element comprises a tracking feature and the processing system is operable to determine the movement measures based at least in part on positions of the tracking feature in ones of the captured images.

3. The system of claim 2, wherein the tracking feature comprises a reference mark on a surface of the pendular element.

4. The system of claim 3, wherein the pendular element is transmissive of light in a specified wavelength range and the image sensor is operable to capture images of light in the specified wavelength range.

5. The system of claim 4, further comprising a window transmissive of light in the specified wavelength range that illuminates the image sensor through the pendular element.

6. The system of claim 1, wherein the elastic restraint comprises a first elastic element and a second elastic element that couple opposite sides of the pendular element to the support along an axis parallel to the first direction.

7. The system of claim 6, further comprising a third elastic element and a fourth elastic element that couple opposite sides of the pendular element to the support along an axis orthogonal to the first direction.

8. The system of claim 1, wherein the processing system is operable to determine the movement measures based on comparisons of positions of corresponding structure-related features in ones of the captured images.

9. The system of claim 1, wherein at least one of the movement measures corresponds to an acceleration of the support.

10. The system of claim 1, wherein at least one of the movement measures corresponds to a velocity of the support.

11. The system of claim 1, wherein at least one of the movement measures corresponds to a displacement of the support.

12. The system of claim 1, wherein at least one of the movement measures corresponds to a tilt orientation of the support relative to a gravitational field direction.

13. The system of claim 1, further comprising:
a housing containing the support, the pendular element, the elastic restraint, the image sensor, and the processing system;
a second image sensor in the housing; and
a lens system for focusing light from outside the housing onto the second image sensor;
wherein the processing system is operable to process the images captured by the second image sensor into respective image files.

14. The system of claim 13, wherein the processing system is operable to embed ones of the movement measures into corresponding ones of the image files.

15. The system of claim 13, wherein the processing system is operable to modify ones of the images captured by the second image sensor based on one or more of the movement measures.

16. The system of claim 13, wherein the processing system is operable to generate one or more signals modifying where the focused light is captured by the second image sensor based on one or more of the movement measures.

17. A method, comprising:
elastically coupling a pendular element to a support;
applying to the pendular element a restraining force that opposes movement of the pendular element in at least a first direction;
capturing images of the pendular element; and
determining one or more movement measures describing movement of the support from comparisons of ones of the captured images.

18. The method of claim 17, wherein the coupling, the applying, the capturing, and the determining are performed within a housing, and further comprising:
focusing light from outside the housing along a light path;
capturing images of the focused light in a capture plane; and
processing the captured images of the focused light into respective image files.

19. The method of claim 18, further comprising embedding ones of the movement measures into corresponding ones of the image files.

20. The method of claim 18, further comprising modifying ones of the captured images based on one or more of the movement measures.

21. The method of claim 18, further comprising modifying where the focused light is captured in the capture plane based on one or more of the movement measures.

* * * * *